US010194466B2

(12) United States Patent
Gaal et al.

(10) Patent No.: US 10,194,466 B2
(45) Date of Patent: Jan. 29, 2019

(54) SHARING CHANNEL ACCESS ACROSS MULTIPLE RADIO ACCESS NETWORKS

(71) Applicant: QUALCOMM Incorporated, San Diego, CA (US)

(72) Inventors: Peter Gaal, San Diego, CA (US); Naga Bhushan, San Diego, CA (US); Srinivas Yerramalli, San Diego, CA (US); Wanshi Chen, San Diego, CA (US); Aleksandar Damnjanovic, Del Mar, CA (US); Tingfang Ji, San Diego, CA (US); Tao Luo, San Diego, CA (US); Durga Prasad Malladi, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 14/518,715

(22) Filed: Oct. 20, 2014

(65) Prior Publication Data

US 2015/0110065 A1  Apr. 23, 2015

Related U.S. Application Data

(60) Provisional application No. 61/893,769, filed on Oct. 21, 2013.

(51) Int. Cl.
*H04W 74/04* (2009.01)
*H04W 72/04* (2009.01)
(Continued)

(52) U.S. Cl.
CPC .......... *H04W 74/04* (2013.01); *H04W 16/14* (2013.01); *H04W 72/0446* (2013.01); *H04W 74/0808* (2013.01)

(58) Field of Classification Search
CPC .......... H04L 1887/1854; H04W 28/26; H04W 52/0216; H04W 72/0446; H04W 74/0816
(Continued)

(56) References Cited

U.S. PATENT DOCUMENTS

| 5,291,475 A | 3/1994 | Bruckert et al. |
| 7,639,708 B1 | 12/2009 | Snodgrass et al. |

(Continued)

FOREIGN PATENT DOCUMENTS

JP  2008078807 A  4/2008

OTHER PUBLICATIONS

International Search Report and Written Opinion—PCT/US2014/061535—ISA/EPO—Feb. 5, 2015.
(Continued)

*Primary Examiner* — Marsha D Banks Harold
*Assistant Examiner* — Elton Williams
(74) *Attorney, Agent, or Firm* — Norton Rose Fulbright US LLP

(57) ABSTRACT

Management of shared transmission resources is disclosed for multiple radio access networks (RANs) sharing access to a finite number of transmission slots. Multiple permutations of slot assignments are configured in which each competing network is assigned a specific slot in each permutation. The sequence of permutations provides a fair distribution of spectrum access by the competing networks, such that in each permutation of the permutation sequence, networks assigned to lower priority slots may be assigned to higher priority slots in later permutations.

27 Claims, 9 Drawing Sheets

(51) Int. Cl.
*H04W 16/14* (2009.01)
*H04W 74/08* (2009.01)

(58) Field of Classification Search
USPC .................. 370/347, 337, 458, 503
See application file for complete search history.

(56) References Cited

U.S. PATENT DOCUMENTS

| | | |
|---|---|---|
| 2002/0067736 A1 | 6/2002 | Garcia-Luna-Aceves et al. |
| 2003/0063597 A1 | 4/2003 | Suzuki |
| 2005/0152329 A1 | 7/2005 | Krishnan et al. |
| 2006/0227801 A1* | 10/2006 | Nanda .................. H04L 47/15 370/447 |
| 2007/0155390 A1* | 7/2007 | Kodikara Patabandi .................... H04W 72/1278 455/450 |
| 2008/0280615 A1* | 11/2008 | Vinayakray-Jani .......................... H04L 1/0002 455/437 |
| 2011/0211461 A1* | 9/2011 | Bahr .................. H04L 1/1887 370/245 |
| 2014/0335876 A1* | 11/2014 | Ratasuk ................ H04W 16/14 455/450 |
| 2014/0378157 A1* | 12/2014 | Wei ...................... H04W 16/14 455/454 |
| 2015/0071211 A1* | 3/2015 | Seok ...................... H04W 74/04 370/329 |

OTHER PUBLICATIONS

Legendre S., et al., "The Number System of the Permutations Generated by Cyclic Shift", Journal of Interger Sequences, Jul. 16, 2010 (Jul. 16, 2010). pp. 2-3 , XP055164460, Retrieved from the Internet: URL:http://arxiv.org/abs/1007.2870 [retrieved Jul. 16, 2010].
Ratasuk R. et al., "License-exempt LTE deployment in hererogeneous network", Wireless Communication Systems (ISWCS), 2012 International Symposium on, IEEE, Aug. 28, 2012 (Aug. 28, 2012) , pp. 246-250 , XP032263759, DOI: 10 . 1109/ISWCS. 2012.6328367, ISBN: 978-1-4673-0761-1.

* cited by examiner

SHARING CHANNEL ACCESS ACROSS MULTIPLE RADIO ACCESS NETWORKS

CROSS-REFERENCE TO RELATED APPLICATIONS

This application claims the benefit of U.S. Provisional Patent Application No. 61/893,769, entitled, "SHARING CHANNEL ACCESS ACROSS MULTIPLE RADIO ACCESS NETWORKS", filed on Oct. 21, 2013, which is expressly incorporated by reference herein in its entirety.

BACKGROUND

Field

Aspects of the present disclosure relate generally to wireless communication systems, and more particularly, to sharing channel access across multiple radio access networks (RANs).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UES). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes determining, by a transmitter, a current permutation of a plurality of transmission slot assignments of a transmission frame for a plurality of transmission slots shared by two or more radio access networks (RANs) on a same frequency, selecting, by the transmitter, an assigned transmission slot of the plurality of transmission slot assignments in the current permutation according to an index associated with the transmitter, and initiating, by the transmitter, transmissions on the assigned transmission slot.

In an additional aspect of the disclosure, a method of wireless communication includes determining, by a transmitter, a current permutation of a plurality of transmission slot assignments of a transmission frame for a plurality of common transmission slots shared by two or more RANs on a same frequency, selecting, by the transmitter, an assigned transmission slot of the plurality of transmission slot assignments in the current permutation according to an index associated with the transmitter, detecting, by the transmitter, a number of failed transmissions on the assigned transmission slot, and re-selecting, by the transmitter, a reserved transmission slot in response to the number of failed transmissions exceeding a predetermined threshold, wherein the reserved transmission slot is separate from the plurality of common transmission slots.

In an additional aspect of the disclosure, an apparatus configured for wireless communication includes means for determining, by a transmitter, a current permutation of a plurality of transmission slot assignments of a transmission frame for a plurality of transmission slots shared by two or more RANs on a same frequency, means for selecting, by the transmitter, an assigned transmission slot of the plurality of transmission slot assignments in the current permutation according to an index associated with the transmitter, and means for initiating, by the transmitter, transmissions on the assigned transmission slot.

In an additional aspect of the disclosure, an apparatus configured for wireless communication includes means for determining, by a transmitter, a current permutation of a plurality of transmission slot assignments of a transmission frame for a plurality of common transmission slots shared by two or more RANs on a same frequency, means for selecting, by the transmitter, an assigned transmission slot of the plurality of transmission slot assignments in the current permutation according to an index associated with the transmitter, means for detecting, by the transmitter, a number of failed transmissions on the assigned transmission slot, and means for re-selecting, by the transmitter, a reserved transmission slot in response to the number of failed transmissions exceeding a predetermined threshold, wherein the reserved transmission slot is separate from the plurality of common transmission slots.

In an additional aspect of the disclosure, a computer-readable medium having program code recorded thereon. This program code includes code to determine, by a transmitter, a current permutation of a plurality of transmission slot assignments of a transmission frame for a plurality of transmission slots shared by two or more radio access networks (RANs) on a same frequency, code to select, by the transmitter, an assigned transmission slot of the plurality of transmission slot assignments in the current permutation according to an index associated with the transmitter, and code to initiate, by the transmitter, transmissions on the assigned transmission slot.

In an additional aspect of the disclosure, a computer-readable medium having program code recorded thereon. This program code includes code to determine, by a transmitter, a current permutation of a plurality of transmission slot assignments of a transmission frame for a plurality of common transmission slots shared by two or more RANs on a same frequency, code to select, by the transmitter, an assigned transmission slot of the plurality of transmission slot assignments in the current permutation according to an index associated with the transmitter, code to detect, by the transmitter, a number of failed transmissions on the assigned transmission slot, and code to re-select, by the transmitter, a reserved transmission slot in response to the number of failed transmissions exceeding a predetermined threshold, wherein the reserved transmission slot is separate from the plurality of common transmission slots.

In an additional aspect of the disclosure, an apparatus includes at least one processor and a memory coupled to the processor. The processor is configured to determine, by a transmitter, a current permutation of a plurality of transmission slot assignments of a transmission frame for a plurality of transmission slots shared by two or more radio access networks (RANs) on a same frequency, to select, by the transmitter, an assigned transmission slot of the plurality of transmission slot assignments in the current permutation according to an index associated with the transmitter, and to initiate, by the transmitter, transmissions on the assigned transmission slot.

In an additional aspect of the disclosure, an apparatus includes at least one processor and a memory coupled to the processor. The processor is configured to determine, by a transmitter, a current permutation of a plurality of transmission slot assignments of a transmission frame for a plurality of common transmission slots shared by two or more RANs on a same frequency, to select, by the transmitter, an assigned transmission slot of the plurality of transmission slot assignments in the current permutation according to an index associated with the transmitter, to detect, by the transmitter, a number of failed transmissions on the assigned transmission slot, and to re-select, by the transmitter, a reserved transmission slot in response to the number of failed transmissions exceeding a predetermined threshold, wherein the reserved transmission slot is separate from the plurality of common transmission slots.

DETAILED DESCRIPTION

Figure 1:
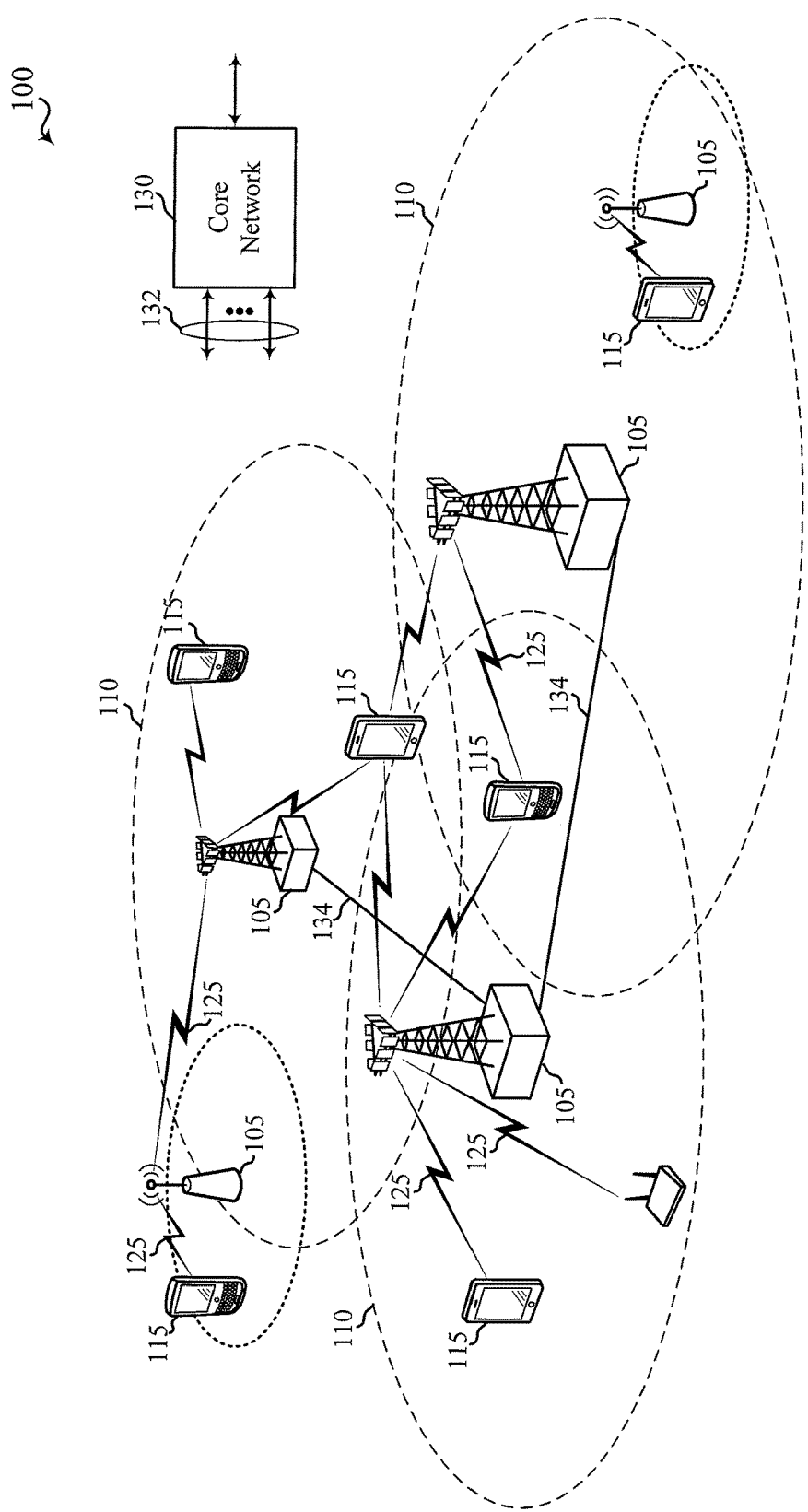
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE or LTE-Advanced (LTE-A) in an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators), compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network on an unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A with and without unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.). In this mode, there may be close interworking between LTE/LTE-A with and without unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE/LTE-A network without unlicensed spectrum. In this case, there may be a loose interworking between LTE/LTE-A with and without unlicensed spectrum based on RLC-level aggregation with co-located LTE/LTE-A cells with and without unlicensed spectrum, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base, stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with and without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the system 100, various deployment scenarios for LTE/LTE-A network with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A network deployment scenarios or modes of operation with unlicensed spectrum in a system such as the system 100, as well as other features and functions related to the operation of LTE/LTE-A with unlicensed spectrum, are provided below with reference to FIGS. 2A-9.

Figure 2A:
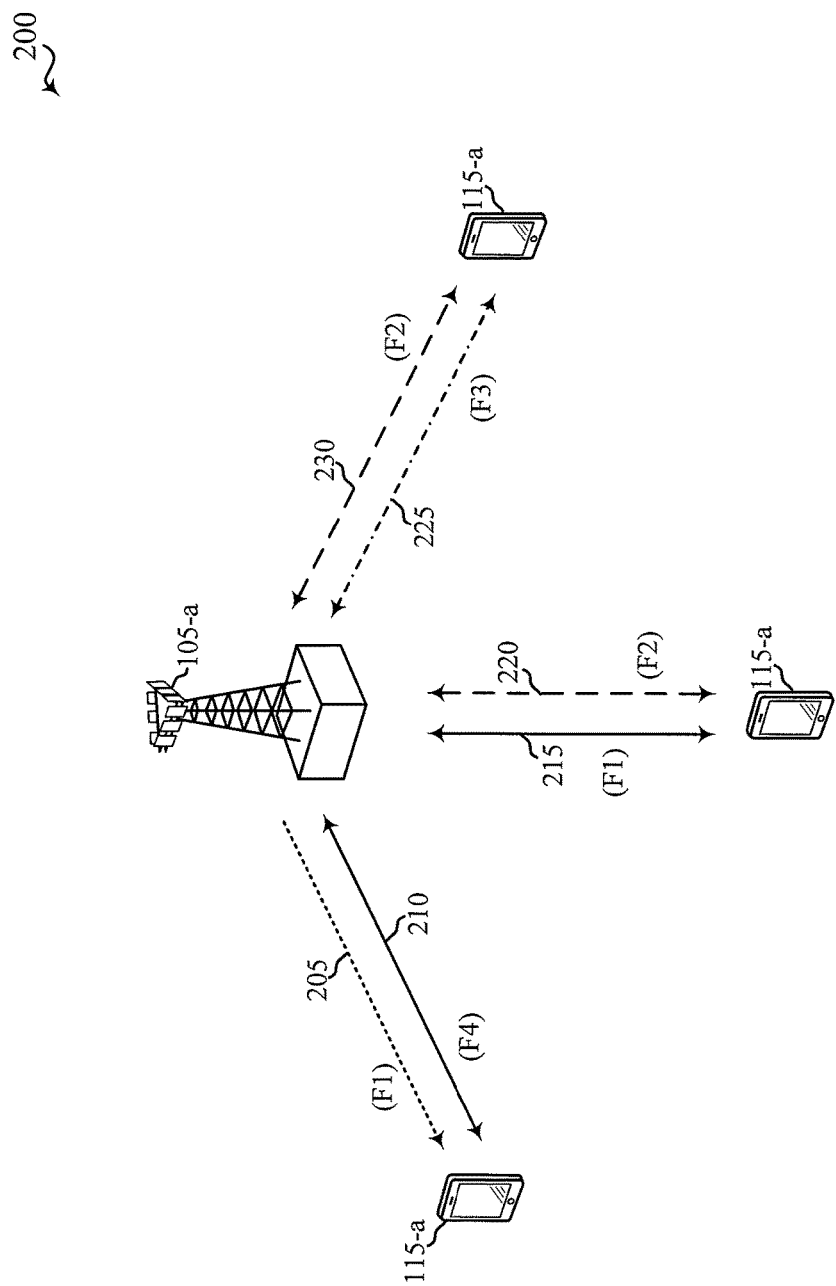
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports communications over unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE/LTE-A in an unlicensed band is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
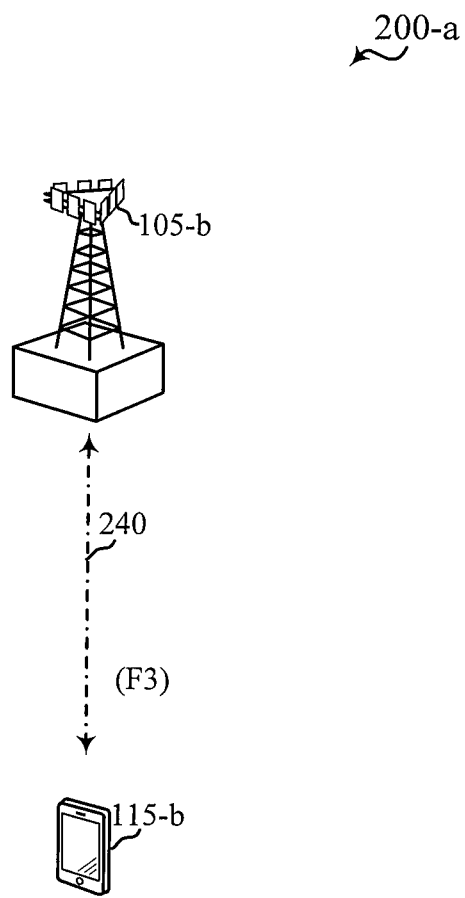
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
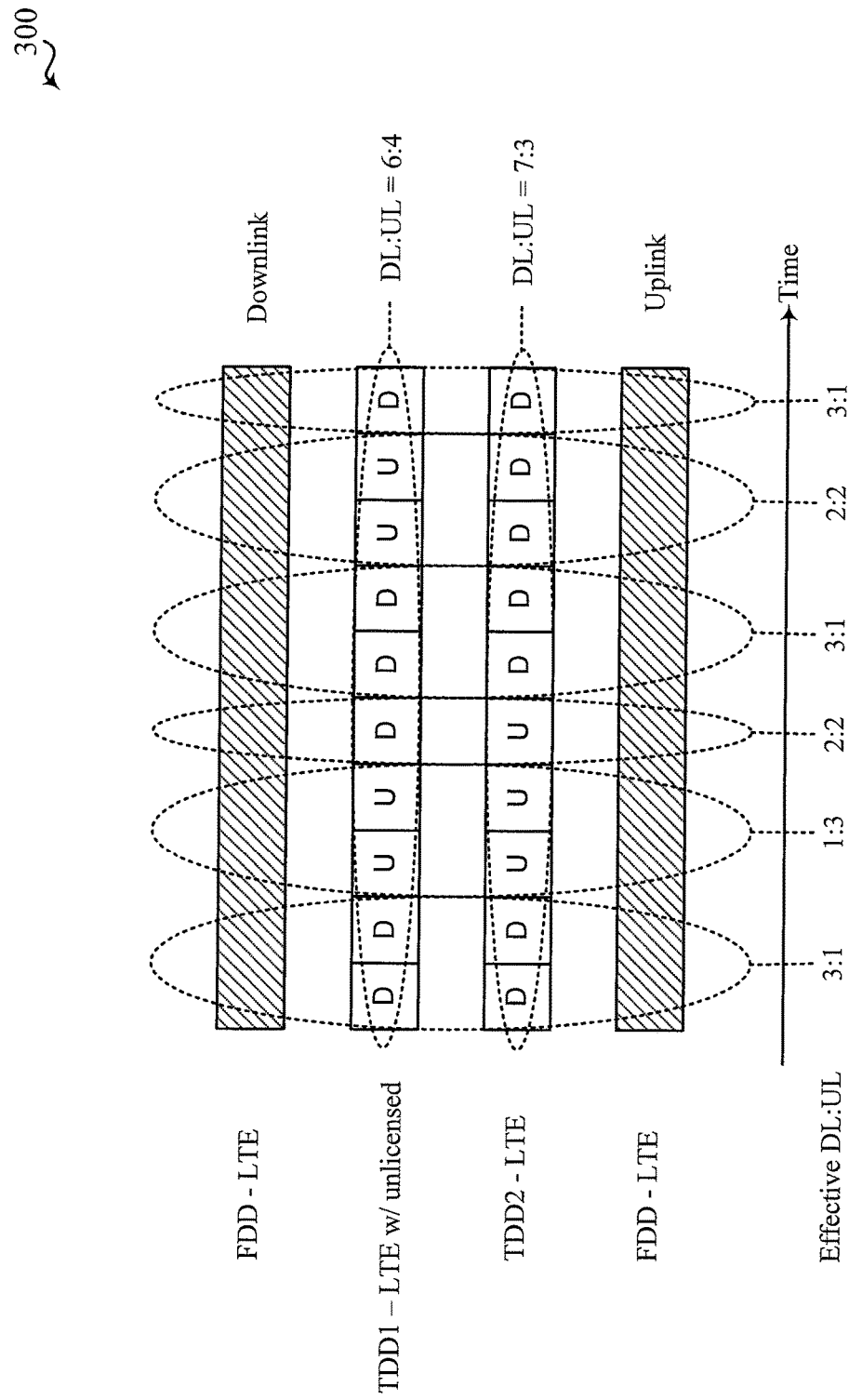
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE and LTE-U.

Figure 4:
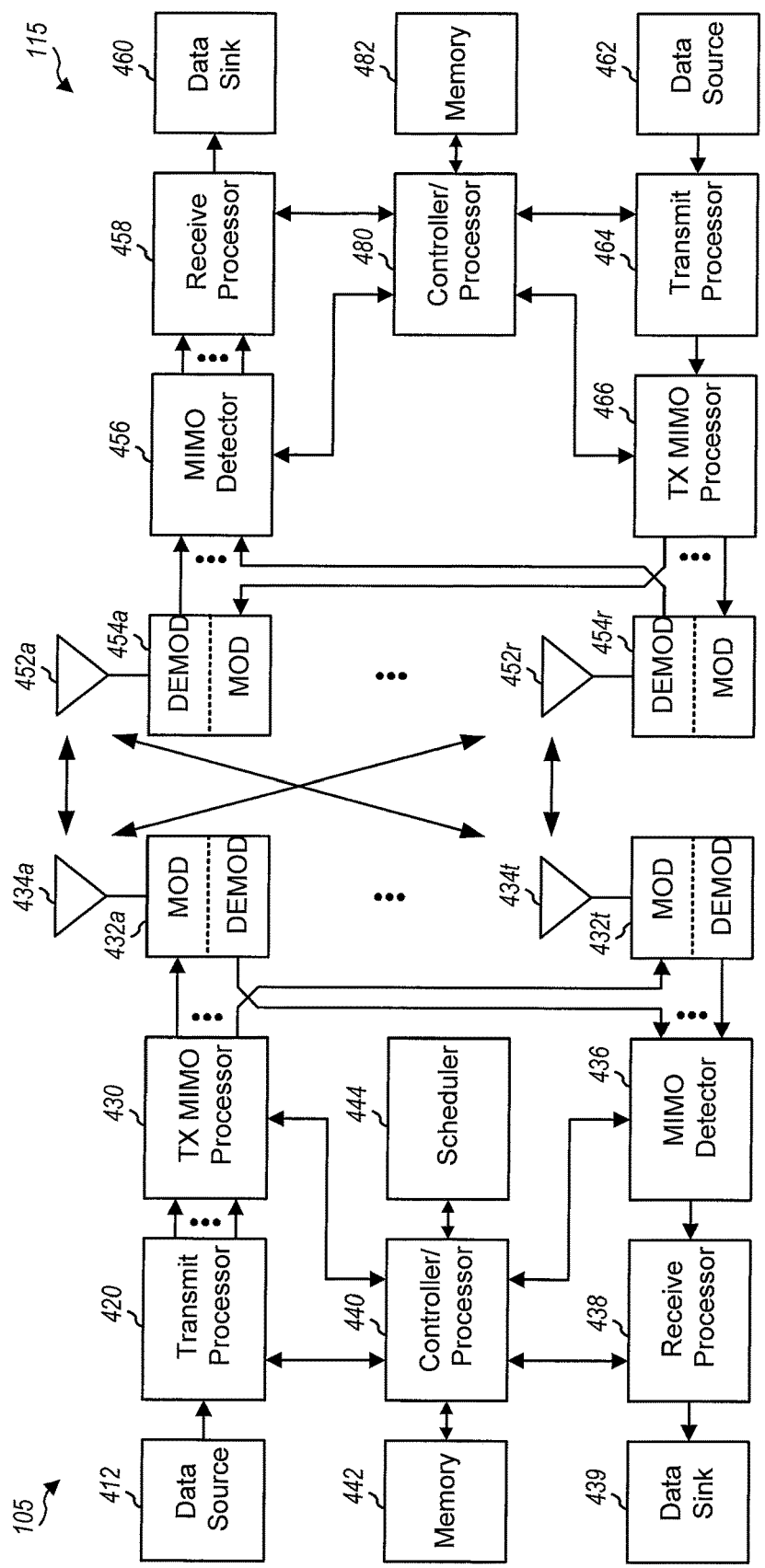
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 7-9, and/or other processes for the techniques described herein. The memories 442 and 482 may store data and program codes for the eNB 105 and the UE 115, respectively. A scheduler 444 may schedule UEs for data transmission on the downlink and/or uplink.

In systems where two or more transmitting entities on different RANs are sharing use of the same available transmission channels at the same time, where no backhaul communication lines or coordination exists between the transmitting entities, and sharing of RAN operations is not provided for, it may be beneficial to provide a system for sharing channel access across the multiple RANs. For example, locations in which Authorized Shared Access (ASA) frequency sharing is employed, multiple mobile network operators with different RANs may, through agreement, share access to the same frequency spectrum.

Figure 5:
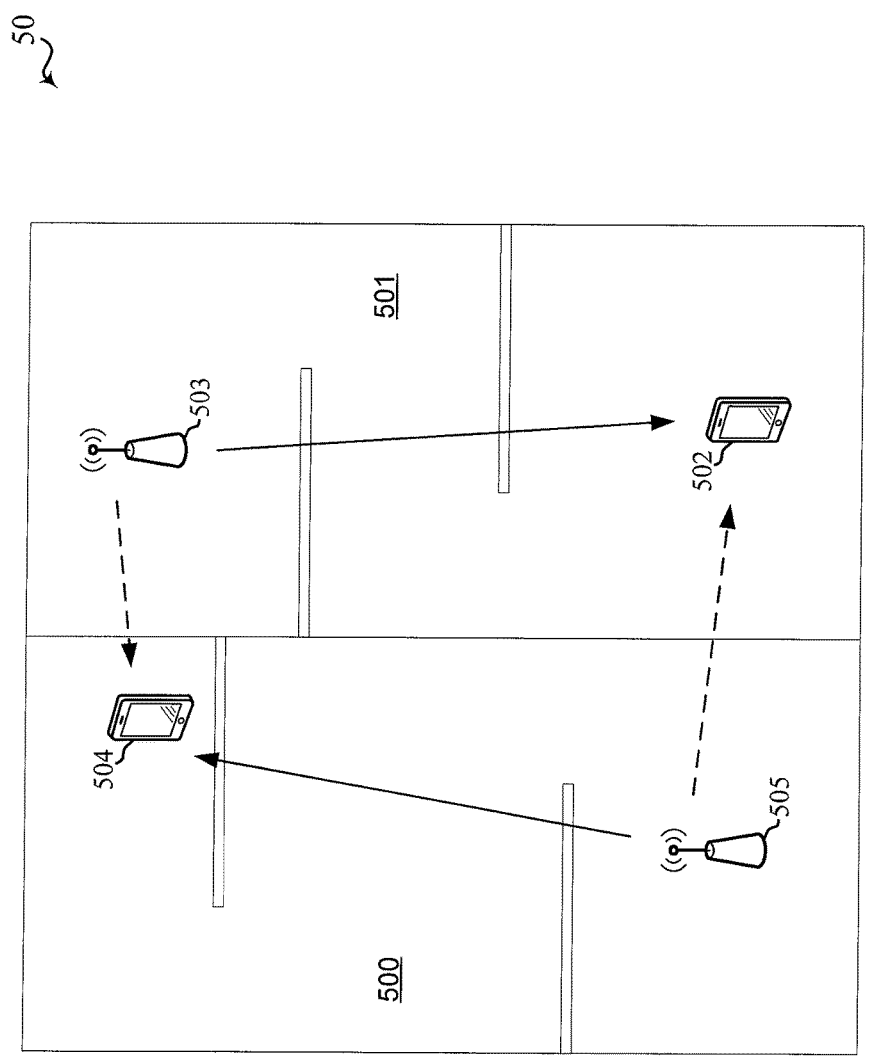
FIG. 5 is a block diagram illustrating building have deployments of two separate small cells providing access to two different mobile network operators over the same transmission channel.

In another example, LTE/LTE-A communication systems with unlicensed spectrum may include multiple small cell deployments using unlicensed spectrum in close proximity to each other. In such locations, multiple mobile network operators may also compete for access to the same transmission channels. FIG. 5 is a block diagram illustrating building 50 have deployments of two separate small cells 503 and 505 providing access to two different mobile network operators over the same transmission channel. Within room 500 of building 50, small cell 505 is deployed by the user of UE 504 providing access to a first operator. Similarly, within room 501, small cell 503 is deployed by the user of UE 502 providing access to a second operator. Small cells 503 and 505 provide closed subscriber group (CSG) access to the first and second operators.

At certain operation times, UE 502 may be closer to neighboring small cell 505 than its own small cell 503, while UE 504 may be closer to neighboring small cell 503 than its own small cell 505. In such instances, the neighboring small cells will cause considerable interference with the communications of UEs 502 and 504. Moreover, as communications from small cells 503 and 505 are occurring over unlicensed spectrum in LTE/LTE-A communication systems with unlicensed spectrum, the interfering transmissions may routinely cause failed CCA checks. Such CSG issues could be resolved through RAN sharing. RAN sharing would provide for small cell 503 to merely allow UE 504 to conduct communication through the mobile network of the second operator, even though UE 504 is subscribed to the first operator. However, such RAN sharing is not a common practice. Alternatively, dynamic frequency selection (DFS) may also provide relief for such CSG issues, but is more relevant to 5 GHz systems. Another solution could be to fallback to licensed spectrum when such CSG issues arise. However, this solution could defeat the benefits of having the small cell deployments, such as small cells 503 and 505. Finally, interference cancellation techniques may be used to simply cancel the interfering neighbor signals. However, such interference cancelation may be too costly in terms of complexity and processing by the various UEs or base stations sharing locations.

Another solution may be to provide offsets for timing and transmissions for small cells 503 and 505. Offsets would alleviate some of the CSG problem of interference. However, offsets would not likely ensure a better or more fair CCA process. When other methods of resolving the CSG issues are not available, CCA alignment may be a better alternative than offsetting. CCA alignment generally results in better frequency reuse, in general, by providing coordinated scheduling between CCA transmission slots for the competing transmitters.

It should be noted that while many of the examples illustrated and described herein involve transmissions over unlicensed spectrum in LTE/LTE-A communication systems with unlicensed spectrum, the various aspects of the present disclosure may apply equally to any shared frequency location where two or more entities share access to the same transmission channels at the same time over different RANs, such as in ASA deployments over licensed spectrum.

In LTE/LTE-A system deployments with unlicensed band carriers using "listen before talk" (LBT) techniques, the transmitting device should sense the channel before initiating transmissions. In a synchronized LTE/LTE-A system with unlicensed spectrum, competing deployments can take turns accessing the unlicensed spectrum by planned assignment of channel sensing periods. Fairness in such turns may be achieved by allocating clear channel assessment (CCA) attempts to different deployments in such a way that access turns may be shared with close to equal probability. In such systems, a given Deployment A would be assigned a CCA period ahead of Deployment B with the same probability as Deployment B being assigned a CCA period ahead of Deployment A.

Figure 6:
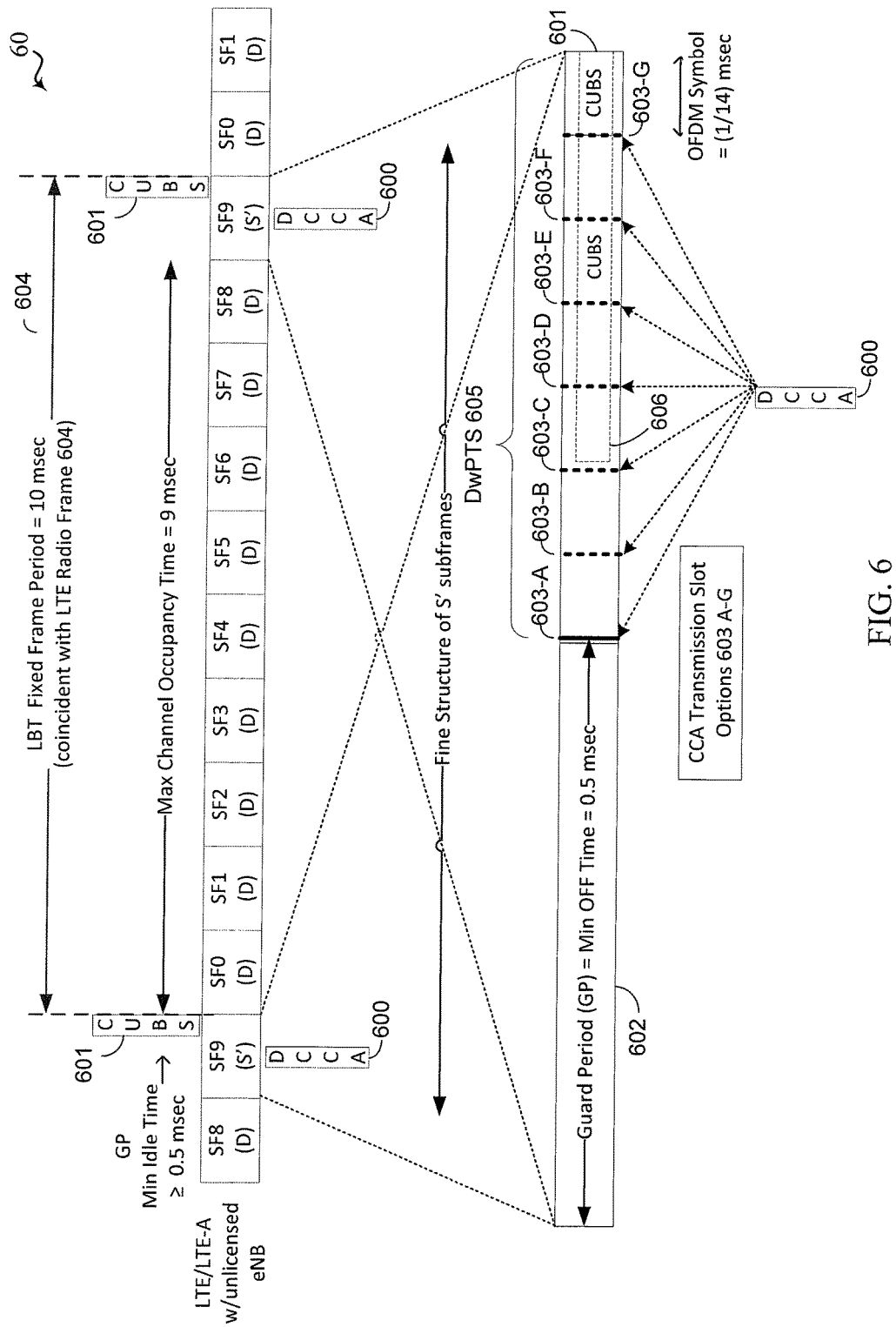
FIG. 6 is a block diagram illustrating a transmission stream in a synchronized LTE-U communication system.

FIG. 6 is a block diagram illustrating transmission stream 60 in a synchronized LTE/LTE-A communication system with unlicensed spectrum. Transmission stream 60 is divided into LTE radio frames, such as LTE radio frame 604, each of such radio frame further divided into 10 subframes (subframes 0-9) that may be configured for uplink communication (U), downlink communications (D), or a special subframe (S') which includes a uplink pilot time slot (UpPTS) (not shown) that may include uplink communications, a guard period, such as guard period 602, and a downlink pilot time slot (DwPTS) 605 that may include downlink communications. Prior to initiating communications on an unlicensed carrier, the transmitter originating transmission stream 60 transmits downlink CCA (DCCA) 600 in one of seven possible transmission slots, CCA transmission slot options 603-A-603-G. If the transmitter detects a clear CCA, then the unlicensed channel is occupied by channel usage beacon signal (CUBS) 601 prior to any actual data transmissions from the transmitter. Once a CCA has been conducted, the transmitter will not be required to perform another CCA check for a period of 10 ms, which is incident to a radio frame, such as LTE radio frame 604.

When competing deployments are in the vicinity of the transmitter originating transmission stream 60, the transmitter will be assigned one of CCA transmission slot options 603-A-603-G, while the competing deployments may be assigned others of the CCA transmission slot options 603-A-603-G. It is likely that the deployment assigned for CCA in an earlier one of CCA transmission slot options 603-A-603-G may detect a clear CCA and begin CUBS transmission before the competing deployment attempts CCA. The subsequent CCA attempt will then fail through detection of the CUBS transmission. For example, in an alternate aspect illustrated in FIG. 6, the transmitter is assigned CCA transmission slot option 603-C for the CCA check. The transmitter detects a clear CCA and immediately begins transmitting CUBS 606. Any competing deployments assigned to any of CCA transmission slot options 603-D-603-G will detect CUBS 606 and their respective CCA checks will fail.

CCA transmission slot options may be randomly allocated to competing deployments by public land mobile network (PLMN). However, while random allocation may result in fair assignment within a given set of CCA transmission slot options, random allocation does not guarantee that subsequent radio frames will result in fair assignment across radio frames. Moreover, random allocation also does not guarantee that collisions will not occur in which two or more separate deployments will be assigned to the same placement option. In such a case, where two or more separate deployments are assigned to the same placement option, each deployment may detect a clear channel and begin transmitting colliding CUBS. Therefore, instead of a random allocation of CCA positions to each PLMN, various aspects of the present disclosure use permutations of allocation sequences. An allocation sequence assigns each PLMN deployment to a separate transmission slot. Permutations of each sequence are then generated into a sequence of permutations that provide for a fair assignment both within the current frame and across frames. By using sequences of permutations, collisions may be completely avoided as long as the number of PLMNs is no more than the number of CCA transmission slot options. By defining an appropriate sequence of permutations, fairness between any pair of PLMNs can be ensured.

For example, let P be a permutation of the integers {0, 1, 2, 3, 4, 5, 6} that represent the seven possible CCA transmission slot options that may be commonly shared among the competing PLMN entities. In an example sequence of permutations, a first permutation, $P_0$, may provide the integer sequence {3, 5, 0, 1, 6, 2, 4}, a second permutation, $P_1$, may provide the integer sequence {0, 2, 6, 4, 1, 5, 3}, and a third permutation, $P_2$, may provide the integer sequence {1, 5, 2, 4, 3, 6, 0}, a fourth permutation, $P_3$, may provide the integer sequence {2, 3, 6, 4, 0, 5, 1}, and a fifth permutation, $P_4$, may provide the integer sequence {5, 1, 4, 3, 2, 0, 6}. The slot assignment sequences of permutations $P_0$-$P_4$ may be randomly or pseudo-randomly generated. Moreover, the various PLMN entities may be randomly assigned an index associated with one of the possible 7 shared slots. Accordingly, in such systems, there would be a 1-in-7 chance that two PLMN entities will be assigned to the same slot causing a CCA or transmission collision reducing performance.

The method for generating permutations $P_0$-$P_4$ is known in advance to each PLMN entity. Therefore, each PLMN entity in the operating region can autonomously generate permutations $P_0$-$P_4$. The specific sequence of permutations may be determined based on a group ID associated with various PLMN entities. For example, two sequences of permutations are defined in a given operating region: first sequence {$P_0$, $P_2$, $P_1$} associated with group ID 1; and second sequence {$P_3$, $P_0$, $P_4$} associated with group ID 2. For purposes of this example, three PLMN entities in the operating region are assigned to group ID 1, while two other PLMN entities in the operating region are assigned to group ID 2. All five of the PLMN entities are capable of generating permutations $P_0$-$P_2$. However, because they are associated with group ID 1, the three PLMN entities determine the first sequence {$P_0$, $P_2$, $P_1$} associated with group ID 1, while the two other PLMN entities determine the second sequence {$P_3$, $P_0$, $P_4$} associated with group ID 2.

In the first transmission frame, the three PLMN entities (e.g., TX1, TX2, and TX3) of group ID 1 use the transmission slot sequence associated with permutation $P_0$ {3, 5, 0, 1, 6, 2, 4}. In addition to their assigned group IDs, TX1-TX3 are also assigned a CCA index. For example, TX1 is assigned CCA index 3, TX2 is assigned CCA index 6, and TX3 is assigned CCA index 4. This index corresponds to the integer in the permutations and the position of the integer in the permutation represents the particular transmission slot. Thus, TX1 will perform its CCA check in the first transmission slot option, as 3 is located in the first position of permutation $P_0$. TX2 is assigned to perform its CCA check in the fifth transmission slot option with index 6, and TX3 is assigned to perform its CCA check in the seventh transmission slot option with index 4. With this slot assignment, it is likely that TX1 will detect a clear CCA, and begin immediately transmitting CUBS in the second transmission slot option. Thus, TX2 and TX3, when performing their CCA, will detect failure because of the CUBS from TX1. When passing into the second transmission frame, TX1-TX3 move to permutation $P_2$ {1, 5, 2, 4, 3, 6, 0} for conducting the next CCA checks. In permutation $P_2$, TX1 is assigned to perform its CCA in the fifth transmission slot option, TX2 assigned to perform CCA in the sixth transmission slot option, and TX3 assigned to perform it CCA in the fourth transmission slot option. Thus, TX3 will likely detect a clear CCA and begin transmitting CUBS in the fifth transmission slot option, which will cause TX1 and TX2 to fail their CCA checks.

Figures 7, 8:
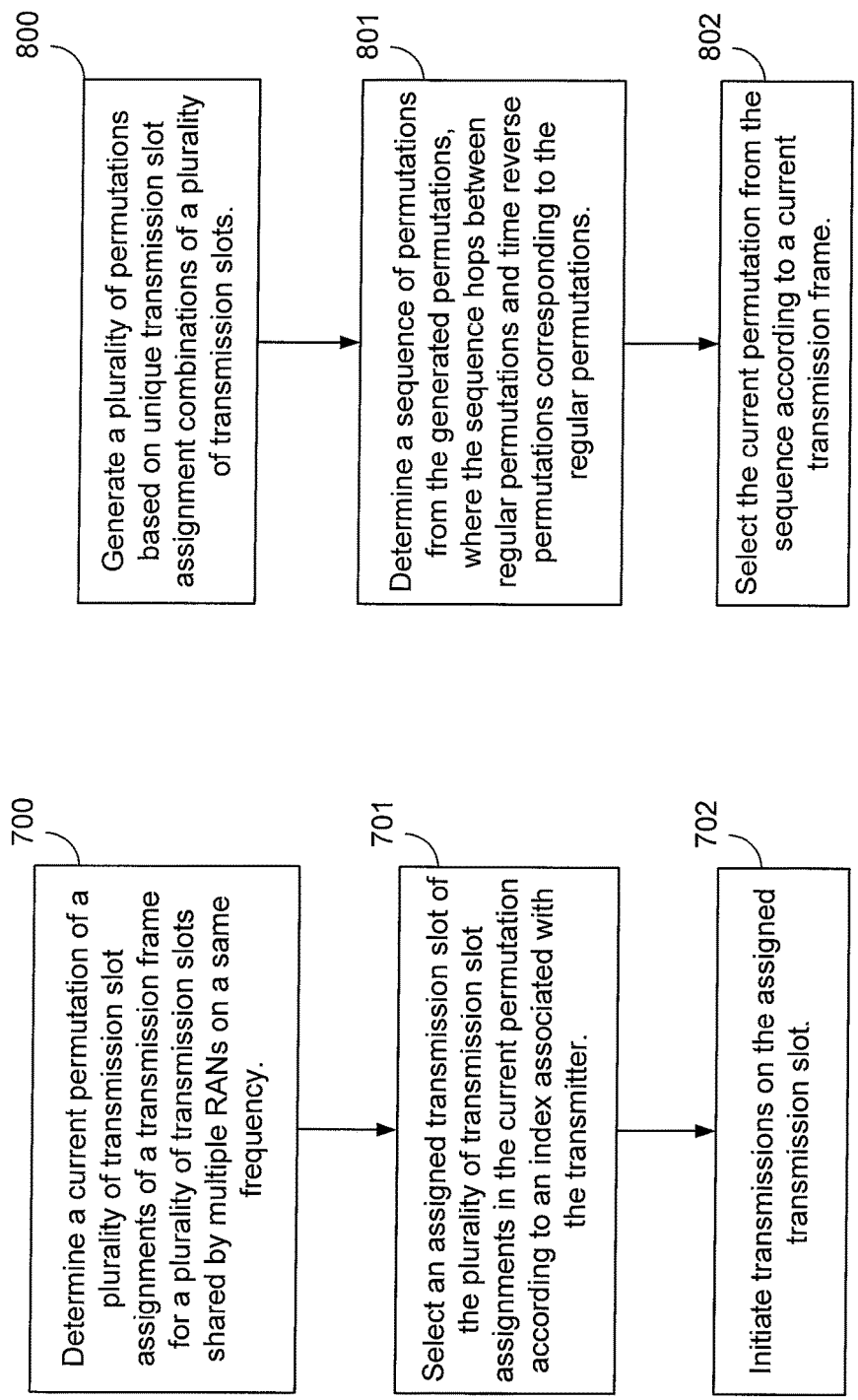
FIGS. 7-9 are a functional block diagrams illustrating example blocks executed to implement aspects of the present disclosure.

FIG. 7 is a functional block diagram illustrating example blocks executed to implement one aspect of the present disclosure. At block 700, a transmitter determines a current permutation of a plurality of transmission slot assignments of a transmission frame for a plurality of transmission slots shared by two or more RANs on a same frequency. The transmitter generates the available permutations and, based on the group ID associated with the transmitter, selects the sequence of permutations. The current permutation will correspond to the current transmission frame.

At block 701, the transmitter selects an assigned transmission slot of the plurality of transmission slot assignments in the current permutation according to an index associated with the transmitter. As indicated above, each permutation has a set of numbers arranged in a particular sequence which represents the assignment of a particular transmission slot of a set of shared transmission slots to an associated PLMN entity. The index associated with the PLMN entity is used to determine the particular transmission slot. At block 702, the transmitter initiates transmissions on the assigned transmission slot. For example, the transmitter may perform a CCA check or begin data transmissions.

One alternative permutation sequence provides a sequence in which each permutation of the sequence is cyclic shifted by the same amount (e.g., by one) of the preceding permutation in the sequence. This configuration provides an equal probability for each PLMN entity to occupy the highest priority (first) CCA transmission slot option. However, it does not ensure fairness between a given pair of PLMN entities. For example, between a pair of PLMN entities occupying adjacent slots, one entity would take priority six times versus the other entity taking priority once.

In order to improve the fairness of the various sequences of permutations, a form of mirror hopping may be used in the sequence. For example, mirror hopping may be used to define a fair permutation sequence of [$P_0$, $-P_0$, $P_0$, $-P_0$, . . . ] for each frame, where $-P_0$ gives the time reverse sequence relative to $P_0$. With $P_0$ having a slot sequence {4, 2, 6, 1, 0, 5, 3}the time reversed sequence $-P_0$ has the slot sequence {3, 5, 0, 1, 6, 2, 4}Thus, in the $P_0$ permutation of the first frame, a first transmitter with an index 2 may detect a clear CCA over a second transmitter with an index 5, which would have a CCA failure based on the first transmitter's successful CCA in the second slot. In the next frame, when the hopping is implemented to the time reversed permutation $-P_0$, since the sequence of slots is time reversed, the second transmitter with index 5 is now located before the slot associated with the first transmitter with index 2. Thus, the hopping would provide a fair, pair-wise sequence.

FIG. 8 is a functional block diagram illustrating example blocks executed to implement one aspect of the present disclosure. At block 800, a transmitter generates a plurality of permutations based on unique transmission slot assignment combinations of a plurality of transmission slots. The method for generating each of the permutations is known to each transmitting entity. The plurality of transmission slots are shared between multiple transmitters having different PLMN entities.

At block 801, the transmitter determines a sequence of permutations from the generated permutations, where the sequence hops between regular permutations and time reverse permutations corresponding to the regular permutations. The particular sequence of permutations is based on the group ID assigned to the transmitter, such that additional transmitters associated with the same group ID will use the same sequence of permutations. The hopping between regular and time reversed permutations may occur from frame to frame or may be configured according to patterns of multiple permutations of the same type. At block 802, the transmitter selects the current permutation from the sequence according to a current transmission frame.

It should be noted that the mirror hopping functionality above may not always provide for a fair sequence of permutations. For example, with reference to the mirror hopping sequence for the two transmitters above with indices 2 and 5, if there was a third transmitter with an index 0, the CCA check for the third transmitter would be blocked regardless of whether the permutation used is $P_0$ or the time reversed sequence $-P_0$. In general, with any set of three indices, the index positioned in the middle of the permutation would be persistently blocked. However, the probability of three nodes in close proximity continuously transmitting is lower than that of two nodes in close proximity continuously transmitting.

The particular hopping function used in establishing the sequence of permutations may be selected to provide various behaviors. For example, in one example hopping permutation sequence, the permutation hops from frame to frame, e.g., $[P_0, -P_0, P_1, -P_1, P_2, -P_2, \ldots]$. With the sequence hopping between the regular and time reversed permutations and with the permutations advancing after each time reversed permutation, there is low delay, but weak persistence because, with the changing permutations, feedback from the receiver may not arrive in time to be useful, as the interference will change from frame to frame.

In a second hopping permutation sequence, the permutations a maintained longer over multiple frames before hopping to the set of time reversed permutations and advancing to subsequent permutations, e.g., $[P_0, P_0, \ldots P_0, -P_0, -P_0, \ldots -P_0, P_1, P_1, \ldots P_1, -P_1, -P_1, \ldots -P_1]$. The delay in this hopping permutation sequence is much longer with a stronger persistence. Thus, the interference remains more constant over several frames. Feedback from the receiver will allow the transmitter to adjust transmission characteristics.

In a third hopping permutation sequence, low delay is exhibited with a strong persistence. The permutations hop between regular and time reversed from frame to frame, but repeat the same permutation hopping over several sets of frames, e.g., $[P_0, -P_0, \ldots, P_0, -P_0, P_1, -P_1, \ldots P_1, -P_1, \ldots]$. The feedback measurements in such hopping patterns may be divided into subsets, such that a first subset may be designated for even-numbered frames while a second subset of feedback may be designated for odd-numbered frames.

Various aspects of the present disclosure directed to management of CCA opportunities in LTE/LTE-A communication systems with unlicensed spectrum operate with seven available CCA transmission slot options. If there are more than seven mobile network operators, multiple group IDs may be used to generate multiple sequences of permutations. However, the multiple sequences may still result in collisions when PLMN entities are assigned to the same transmission slots because of overlapping sequences.

An alternative solution for scenarios with more than seven mobile network operators reserves one of the seven CCA transmission slot options and allocates the remaining six to the mobile network operators in which some of the six transmission slots will be allocated to multiple MNOs. In such cases, where a UE or eNB experiences a CSG-type issues, with strong interference and transmissions competing for the same channels at the same time, the PLMN entity experiencing such issues are allowed to switch from its allocated transmission slot opportunity to the reserved slot. If the CSG situation is still not resolved after switching to the reserved transmission slot, the PLMN entity is then allowed to select a different group ID, as last resort, to generate a different sequence of permutations and subsequent slot assignments and reservations.

Figure 9:
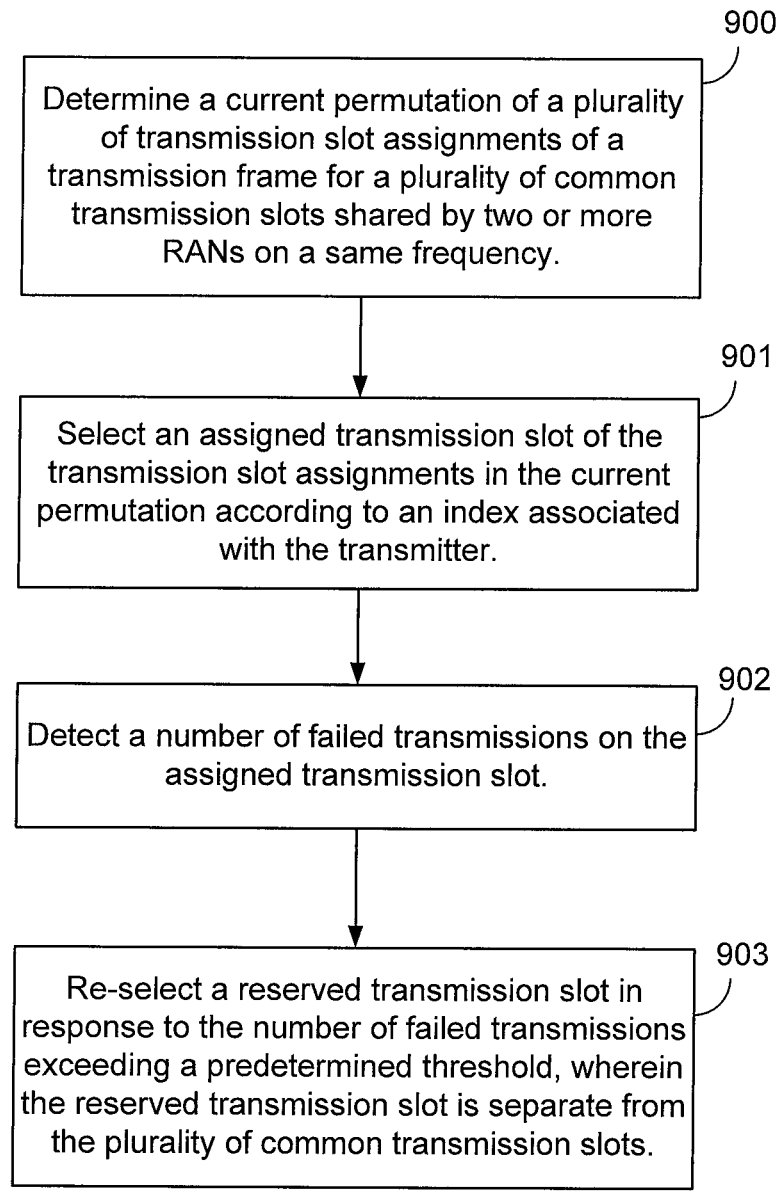

FIG. 9 is a functional block diagram illustrating example blocks executed to implement one aspect of the present disclosure. At block 900, a transmitter determines a current permutation of a plurality of transmission slot assignments of a transmission frame for a plurality of common transmission slots shared by two or more RANs on a same frequency. At block 901, the transmitter selects an assigned transmission slot of the transmission slot assignments in the current permutation according to an index associated with the transmitter. At block 902, the transmitter detects a number of failed transmissions on the assigned transmission slot. If the transmitter continues to experience these CSG issues and failed CCA attempts, it suggests that a collision may be taking place in which multiple PLMN entities are assigned to the same slot. At block 903, the transmitter re-selects, in response to the number of failed transmissions exceeding a predetermined threshold, a reserved transmission slot separate from the common transmission slots. The reserved slot may relieve the CSG issues or provide a separate allocation of transmission slot in order to alleviate the collision. If the transmitter still continues to experience such CSG issues or failed transmissions, it may be allowed to re-select a new group ID which provides the ability to determine a new sequence of permutations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7-9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method of wireless communication, comprising:
   determining, by a transmitter of a plurality of transmitters, a current permutation of a plurality of permutations,
      wherein a permutation defines an allocation sequence that assigns each of the plurality of transmitters to a separate assigned clear channel assessment (CCA) transmission slot opportunity of a plurality of CCA transmission slot opportunities within a transmission slot of a transmission frame, and
      wherein the plurality of CCA transmission slot opportunities are shared by two or more radio access networks (RANs) on a same frequency;
   selecting, by the transmitter, the transmitter's assigned CCA transmission slot opportunity of the plurality of CCA transmission slot opportunities in the current permutation according to an index associated with the transmitter; and
   initiating, by the transmitter, transmissions on the transmission slot that includes the plurality of CCA transmission slot opportunities, wherein initiating transmissions includes:
      performing a CCA on the transmitter's assigned CCA transmission slot opportunity, wherein the same frequency is a shared frequency; and
      transmitting a channel usage beacon signal (CUBS) immediately within at least a next CCA transmission slot opportunity in response to the CCA being detected by the transmitter as clear, thereby transmitting the CUBS on the shared frequency during all CCA transmission slot opportunities within the transmission slot of the transmission frame that are subsequent to the transmitter's assigned CCA transmission slot opportunity.

2. The method of claim 1, wherein the determining the current permutation includes:
   determining, by the transmitter, a sequence of the plurality of permutations based on a group identifier associated with the transmitter, wherein the plurality of permutations is based on unique assignment combinations of the plurality of CCA transmission slot opportunities, and wherein the sequence of the plurality of permutations is determined one of: randomly or pseudo-randomly; and
   selecting, by the transmitter, the current permutation for the transmission frame from the sequence of the plurality of permutations.

3. The method of claim 2, wherein the selecting is based, at least in part, on the group identifier associated with the transmitter.

4. The method of claim 2, further including:
   determining a next permutation for a next transmission frame, wherein the next permutation is selected from the sequence of the plurality of permutations;
   selecting a next assigned CCA transmission slot opportunity of a next plurality of CCA transmission slot opportunities in the next permutation according to the index associated with the transmitter; and
   initiating additional transmissions on a next transmission slot including the next plurality of CCA transmission slot opportunities.

5. The method of claim 2, wherein the sequence of the plurality of permutations includes a hopping function, wherein the hopping function provides one or more permutations in the sequence followed by one or more corresponding subsequent permutations in which the one or more corresponding subsequent permutations include a time-reversed plurality of CCA transmission slot opportunity assignments relative to the one or more permutations.

6. The method of claim 5, wherein the hopping function provides for the sequence to include:
   a first permutation of the one or more permutations followed adjacently by a first time-reversed permutation of the one or more corresponding subsequent permutations corresponding to the first permutation, the first time-reversed permutation followed adjacently by a next permutation of the one or more permutations followed adjacently by a next time-reversed permutation of the one or more corresponding subsequent permutations corresponding to the next permutation.

7. The method of claim 5, wherein the hopping function provides for the sequence to include:
   a plurality of adjacent first permutations of the one or more permutations, a last of the plurality of adjacent first permutations followed adjacently by a plurality of adjacent time-reversed permutations of the one or more corresponding subsequent permutations corresponding to the first permutations, wherein the sequence repeats with the plurality of adjacent first permutations followed adjacently by the plurality of adjacent time-reversed permutations.

8. The method of claim 5, wherein the hopping function provides for the sequence to include:
   a plurality of adjacent pairs of first permutations of the one or more permutations followed adjacently by first time-reversed permutations of the one or more corresponding subsequent permutations corresponding to the first permutations, a last of the plurality of adjacent pairs followed adjacently by a next plurality of adjacent pairs of next permutations of the one or more permutations followed adjacently by next time-reversed permutations of the one or more corresponding subsequent permutations corresponding to the next permutations, wherein the allocation sequence repeats with the plurality of adjacent pairs followed adjacently by the next plurality of adjacent pairs.

9. The method of claim 8, further comprising:
   requesting a first channel state information (CSI) feedback from a receiver for a first set of frames associated with the plurality of adjacent pairs; and
   requesting a next CSI feedback from the receiver for a next set of frames associated with the next plurality of adjacent pairs.

10. The method of claim 1, wherein the determining the current permutation includes:
    determining, by the transmitter, a first permutation based on a unique assignment combination of the plurality of CCA transmission slot opportunities;
    generating the sequence of the plurality of permutations, wherein the plurality of permutations includes the first permutation and one or more additional permutations, wherein each of the one or more additional permutations is cyclic shifted by a same amount from a previous permutation in the plurality of permutations; and
    selecting, by the transmitter, the current permutation for the transmission frame from the sequence of the plurality of permutations.

11. The method of claim 1, further including:
    detecting, by the transmitter, a number of failed transmission attempts due to failed CCA checks utilizing the transmitter's assigned CCA transmission slot opportunity, wherein the number is greater than one; and
    re-selecting, by the transmitter, a reserved CCA transmission slot opportunity in response to the number of failed transmission attempts exceeding a predetermined threshold, wherein the reserved CCA transmission slot opportunity is separate from the plurality of CCA transmission slot opportunities.

12. The method of claim 11, further including:
    detecting, by the transmitter, a next number of failed transmission attempts utilizing the reserved CCA transmission slot opportunity after the re-selecting;
    selecting, by the transmitter, a new transmitter group identifier in response to the next number of failed transmission attempts exceeding another predetermined threshold; and
    determining, by the transmitter, a new current permutation from another plurality of permutations, wherein the other plurality of permutations is determined based on the new transmitter group identifier.

13. A non-transitory computer-readable medium having program code recorded thereon, the program code comprising:
    program code for causing a computer to determine, by a transmitter of a plurality of transmitters, a current permutation of a plurality of permutations,
        wherein a permutation defines an allocation sequence that assigns each of the plurality of transmitters to a separate assigned clear channel assessment (CCA) transmission slot opportunity of a plurality of CCA transmission slot opportunities within a transmission slot of a transmission frame, and
        wherein the plurality of CCA transmission slot opportunities are shared by two or more radio access networks (RANs) on a same frequency;

program code for causing the computer to select, by the transmitter, the transmitter's assigned CCA transmission slot opportunity of the plurality of CCA transmission slot opportunities in the current permutation according to an index associated with the transmitter; and program code for causing the computer to initiate, by the transmitter, transmissions on the transmission slot that includes the plurality of CCA transmission slot opportunities, wherein the program code for causing the computer to initiate transmissions includes:

program code for causing the computer to perform a clear channel assessment (CCA) on the transmitter's assigned CCA transmission slot opportunity, wherein the same frequency is a shared frequency; and program code for causing the computer to transmit a channel usage beacon signal (CUBS) immediately within at least a next CCA transmission slot opportunity in response to the CCA being detected by the transmitter as clear, thereby transmitting the CUBS on the shared frequency during all CCA transmission slot opportunities within the transmission slot of the transmission frame that are subsequent to the transmitter's assigned CCA transmission slot opportunity.

14. The non-transitory computer-readable medium of claim 13, wherein the program code for causing the computer to determine the current permutation includes program code for causing the computer to:

determine, by the transmitter, a sequence of the plurality of permutations based on a group identifier associated with the transmitter, wherein the plurality of permutations is based on unique assignment combinations of the plurality of CCA transmission slot opportunities, and wherein the sequence of the plurality of permutations is determined one of: randomly or pseudo-randomly; and select, by the transmitter, the current permutation for the transmission frame from the sequence of the plurality of permutations.

15. The non-transitory computer-readable medium of claim 14, further including program code for causing the computer to:

determine a next permutation for a next transmission frame, wherein the next permutation is selected from the sequence of the plurality of permutations;

select a next assigned CCA transmission slot opportunity of a next plurality of CCA transmission slot opportunities in the next permutation according to the index associated with the transmitter; and initiate additional transmissions on a next transmission slot including the next plurality of CCA transmission slot opportunities.

16. The non-transitory computer-readable medium of claim 14, wherein the sequence of the plurality of permutations includes a hopping function, wherein the hopping function provides one or more permutations in the sequence followed by one or more corresponding subsequent permutations in which the one or more corresponding subsequent permutations include a time-reversed plurality of CCA transmission slot opportunity assignments relative to the one or more permutations.

17. The non-transitory computer-readable medium of claim 16, wherein the hopping function provides for the sequence to include:

a first permutation of the one or more permutations followed adjacently by a first time-reversed permutation of the one or more corresponding subsequent permutations corresponding to the first permutation, the first time-reversed permutation followed adjacently by a next permutation of the one or more permutations followed adjacently by a next time-reversed permutation of the one or more corresponding subsequent permutations corresponding to the next permutation.

18. The non-transitory computer-readable medium of claim 16, wherein the hopping function provides for the sequence to include:

a plurality of adjacent first permutations of the one or more permutations, a last of the plurality of adjacent first permutations followed adjacently by a plurality of adjacent time-reversed permutations of the one or more corresponding subsequent permutations corresponding to the first permutations, wherein the sequence repeats with the plurality of adjacent first permutations followed adjacently by the plurality of adjacent time-reversed permutations.

19. The non-transitory computer-readable medium of claim 16, wherein the hopping function provides for the sequence to include:

a plurality of adjacent pairs of first permutations of the one or more permutations followed adjacently by first time-reversed permutations of the one or more corresponding subsequent permutations corresponding to the first permutations, a last of the plurality of adjacent pairs followed adjacently by a next plurality of adjacent pairs of next permutations of the one or more permutations followed adjacently by next time-reversed permutations of the one or more corresponding subsequent permutations corresponding to the next permutations, wherein the sequence repeats with the plurality of adjacent pairs followed adjacently by the next plurality of adjacent pairs.

20. An apparatus configured for wireless communication, the apparatus comprising:

at least one processor; and a memory coupled to the at least one processor, wherein the at least one processor is configured:

to determine, by a transmitter of a plurality of transmitters, a current permutation of a plurality of permutations, wherein a permutation defines an allocation sequence that assigns each of the plurality of transmitters to a separate assigned clear channel assessment (CCA) transmission slot opportunity of a plurality of CCA transmission slot opportunities within a transmission slot of a transmission frame, and wherein the plurality of CCA transmission slot opportunities are shared by two or more radio access networks (RANs) on a same frequency;

to select, by the transmitter, the transmitter's assigned CCA transmission slot opportunity of the plurality of CCA transmission slot opportunities in the current permutation according to an index associated with the transmitter; and to initiate, by the transmitter, transmissions on the transmission slot that includes the plurality of CCA transmission slot opportunities, wherein the configuration of the at least one processor to initiate transmissions includes configuration:

to perform a CCA on the transmitter's assigned CCA transmission slot opportunity, wherein the same frequency is a shared frequency; and to transmit a channel usage beacon signal (CUBS) immediately within at least a next CCA transmission slot opportunity in response to the CCA being detected by the transmitter as clear, thereby transmitting the CUBS on the shared frequency during all CCA transmission slot opportunities within the transmission slot of the transmission frame that are subsequent to the transmitter's assigned CCA transmission slot opportunity.

21. The apparatus of claim 20, wherein the configuration of the at least one processor to determine the current permutation includes configuration of the at least one processor to:
   determine, by the transmitter, a sequence of the plurality of permutations based on a group identifier associated with the transmitter, wherein the plurality of permutations is based on unique assignment combinations of the plurality of CCA transmission slot opportunities, and wherein the sequence of the plurality of permutations is determined one of: randomly or pseudo-randomly; and
   select, by the transmitter, the current permutation for the transmission frame from the sequence of the plurality of permutations.

22. The apparatus of claim 21, further including configuration of the at least one processor:
   determine a next permutation for a next transmission frame, wherein the next permutation is selected from the sequence of the plurality of permutations;
   select a next assigned CCA transmission slot opportunity of a next plurality of CCA transmission slot opportunities in the next permutation according to the index associated with the transmitter; and
   initiate additional transmissions on a next transmission slot including the next plurality of CCA transmission slot opportunities.

23. The apparatus of claim 21, wherein the sequence of the plurality of permutations includes a hopping function, wherein the hopping function provides one or more permutations in the sequence followed by one or more corresponding subsequent permutations in which the one or more corresponding subsequent permutations include a time-reversed plurality of CCA transmission slot opportunity assignments relative to the one or more permutations.

24. The apparatus of claim 23, wherein the hopping function provides for the sequence to include:
   a first permutation of the one or more permutations followed adjacently by a first time-reversed permutation of the one or more corresponding subsequent permutations corresponding to the first permutation, the first time-reversed permutation followed adjacently by a next permutation of the one or more permutations followed adjacently by a next time-reversed permutation of the one or more corresponding subsequent permutations corresponding to the next permutation.

25. The apparatus of claim 23, wherein the hopping function provides for the sequence to include:
   a plurality of adjacent first permutations of the one or more permutations, a last of the plurality of adjacent first permutations followed adjacently by a plurality of adjacent time-reversed permutations of the one or more corresponding subsequent permutations corresponding to the first permutations, wherein the sequence repeats with the plurality of adjacent first permutations followed adjacently by the plurality of adjacent time-reversed permutations.

26. The apparatus of claim 23, wherein the hopping function provides for the sequence to include:
   a plurality of adjacent pairs of first permutations of the one or more permutations followed adjacently by first time-reversed permutations of the one or more corresponding subsequent permutations corresponding to the first permutations, a last of the plurality of adjacent pairs followed adjacently by a next plurality of adjacent pairs of next permutations of the one or more permutations followed adjacently by next time-reversed permutations of the one or more corresponding subsequent permutations corresponding to the next permutations, wherein the sequence repeats with the plurality of adjacent pairs followed adjacently by the next plurality of adjacent pairs.

27. The apparatus of claim 20, wherein the configuration of the at least one processor to determine the current permutation includes configuration of the at least one processor to:
   determine, by the transmitter, a first permutation based on a unique assignment combination of the plurality of CCA transmission slot opportunities;
   generate the sequence of the plurality of permutations, wherein the plurality of permutations includes the first permutation and one or more additional permutations, wherein each of the one or more additional permutations is cyclic shifted by a same amount from a previous permutation in the plurality of permutations; and
   select, by the transmitter, the current permutation for the transmission frame from the sequence of the plurality of permutations.

* * * * *